(12) United States Patent
Ganapathi Raju et al.

(10) Patent No.: US 11,193,450 B2
(45) Date of Patent: Dec. 7, 2021

(54) NACELLE OF A TURBOJET COMPRISING A BLOCKING DOOR AND A SYSTEM FOR DEPLOYMENT OF THE BLOCKING DOOR

(71) Applicant: Airbus Operations SAS, Toulouse (FR)

(72) Inventors: Sreekanth Ganapathi Raju, Toulouse (FR); Benoit Orteu, Toulouse (FR); Laurent Cazeaux, Tournefeuille (FR); Olivier Denoy, Forgues (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 54 days.

(21) Appl. No.: 16/791,372

(22) Filed: Feb. 14, 2020

(65) Prior Publication Data

US 2020/0263632 A1 Aug. 20, 2020

(30) Foreign Application Priority Data

Feb. 18, 2019 (FR) ...................................... 1901603

(51) Int. Cl.
*F02K 1/72* (2006.01)
*F02K 1/60* (2006.01)

(52) U.S. Cl.
CPC ................ *F02K 1/72* (2013.01); *F02K 1/605* (2013.01)

(58) Field of Classification Search
CPC ... F02K 1/763; F02K 1/76; F02K 1/70; F02K 1/72; F02K 1/62; F02K 1/625
See application file for complete search history.

(56) References Cited

U.S. PATENT DOCUMENTS

| 3,503,211 | A | * | 3/1970 | Holman | .................... F02K 1/72 60/229 |
| 3,511,055 | A | * | 5/1970 | Timms | ...................... F02K 1/72 60/229 |
| 4,278,220 | A | | 7/1981 | Johnston et al. | |
| 4,767,055 | A | * | 8/1988 | Ward | ....................... F02K 1/62 239/265.29 |

(Continued)

FOREIGN PATENT DOCUMENTS

| EP | 3379068 A1 | 9/2018 |
| GB | 2045179 A | 10/1980 |

OTHER PUBLICATIONS

French Search Report; priority document.

*Primary Examiner* — Gerald L Sung
(74) *Attorney, Agent, or Firm* — Greer, Burns & Crain, Ltd.

(57) ABSTRACT

A nacelle comprising a fixed structure with a fixed cowling and a cowling movable in translation between closed and open positions, to open an opening between a duct and the exterior. A blocking door is rotatably movable on the movable cowling between a stowed position and a deployed position. A deployment system comprises an arm with a first end articulated on the blocking door and a second end that bears a stop, a slider fixed to the arm, a linear guide system is fixed on the fixed structure and guides the slide, and a cam. The stop is configured to lie against the cam when the movable cowling reaches an intermediate position from the closed position and to be guided by the cam to drive the rotation of the arm about the slider when the movable cowling moves from the intermediate position to an open position.

9 Claims, 5 Drawing Sheets

(56) References Cited

U.S. PATENT DOCUMENTS

| | | | | |
|---|---|---|---|---|
| 4,828,173 A | * | 5/1989 | Guerty | F02K 1/605 |
| | | | | 239/1 |
| 5,243,817 A | * | 9/1993 | Matthias | F02K 1/76 |
| | | | | 60/226.2 |
| 2006/0185464 A1 | | 8/2006 | Telep et al. | |
| 2011/0108665 A1 | * | 5/2011 | Abrial | F02C 9/00 |
| | | | | 244/110 B |
| 2012/0079805 A1 | | 4/2012 | Stuart et al. | |
| 2016/0169157 A1 | * | 6/2016 | Sawyers-Abbott | F02K 1/72 |
| | | | | 239/1 |
| 2018/0283320 A1 | | 10/2018 | Jolivet | |

\* cited by examiner

NACELLE OF A TURBOJET COMPRISING A BLOCKING DOOR AND A SYSTEM FOR DEPLOYMENT OF THE BLOCKING DOOR

CROSS-REFERENCES TO RELATED APPLICATIONS

This application claims the benefit of the French patent application No. 1901603 filed on Feb. 18, 2019, the entire disclosures of which are incorporated herein by way of reference.

FIELD OF THE INVENTION

The present invention relates to a nacelle of a bypass turbojet that comprises at least one blocking door and a deployment system, a bypass turbojet comprising such a nacelle and an engine, and also an aircraft comprising at least one such bypass turbojet.

BACKGROUND OF THE INVENTION

An aircraft comprises a fuselage, on either side of which is fixed a wing. Under each wing is suspended at least one bypass turbojet. Each bypass turbojet is fixed under the wing by means of a pylon that is fixed between the structure of the wing and the structure of the bypass turbojet.

The bypass turbojet comprises an engine, a nacelle that is fixed about the engine, and a secondary duct that is between the engine and the nacelle and allows the passage of a secondary flow.

The nacelle comprises a fixed cowling, and a movable cowling to the rear of the fixed cowling, and movable in translation between a closed position and an open position. In the closed position, the movable cowling is near to the fixed cowling and forms an aerodynamic continuity. In the open position, the movable cowling is remote from the fixed cowling towards the rear, and opens an opening between the secondary duct and the exterior.

The nacelle also comprises at least one blocking door that is movable between a stowed position, in which it is positioned outside of the secondary duct in such a manner as not to obstruct the secondary flow, and a deployed position, in which it is positioned across the secondary duct in such a manner as to obstruct the secondary flow in order to direct it radially across the opening towards the exterior of the nacelle.

Conventionally, the blocking door is mounted to be movable in rotation on the structure of the nacelle, and a deployment system moves it from the stowed position to the deployed position when the movable cowling passes from the closed position to the open position, and vice versa. The deployment system may comprise a connecting rod arranged in the secondary duct, which requires a cutout in the blocking door to allow the passage of the connecting rod when it moves.

Although the deployment system of such a blocking door is entirely satisfactory, it is desirable to seek different deployment systems and, in particular, a deployment system that is less bulky and does not comprise a connecting rod in the secondary duct.

SUMMARY OF THE INVENTION

An object of the present invention is to propose a nacelle comprising at least one blocking door and a deployment system.

To that end, a nacelle for a bypass turbojet is proposed, the nacelle comprising:

a fixed structure comprising a fixed cowling, a movable cowling movable in translation relative to the fixed cowling in a translational direction parallel to a longitudinal axis X between a closed position, in which it is near to the fixed cowling, and an open position, in which it is remote from the fixed cowling, towards the rear, such as to define between them an opening between a duct for a secondary flow and the exterior of the nacelle, drive means designed to move the movable cowling from the closed position to an intermediate position, then to the open position, and vice versa, a blocking door mounted to be movable in rotation about a rotation axis on the movable cowling between a stowed position, in which it is positioned outside the duct, and a deployed position, in which it lies across the duct, and a deployment system provided such as to coordinate and to delay the passage from the stowed position to the deployed position of the blocking door relative to the passage from the closed position to the open position of the movable cowling, and vice versa, the deployment system comprising:

an arm comprising a first end mounted in an articulated manner on the blocking door and a second end that bears a stop, a slider that is fixed to the arm, a linear guide system that is fixed on the fixed structure and guides the slider parallel to the translational direction, and a cam, where the stop is arranged such as to lie against the cam when the movable cowling reaches the intermediate position from the closed position and such as to be guided by the cam in such a manner as to drive the rotation of the arm about the slider about an axis of deployment parallel to the axis of rotation when the movable cowling moves from the intermediate position to the open position.

Such an arrangement makes it possible to dispense with a connecting rod in the duct, thereby reducing the overall bulk thereof. Furthermore, deployment of the blocking door is delayed relative to the movement of the movable cowling.

Advantageously, the guide system is a groove in which the slider moves, the groove has a closed rear end, and the position of the closed rear end is defined in such a manner that the slider arrives against the closed rear end at the same time as the stop arrives against the cam.

Advantageously, the articulation of the arm on the blocking door is arranged on the rear face of the blocking door.

Advantageously, the cam is mounted to be fixed on the fixed structure and comprises a groove in the form of an arc of a circle.

Advantageously, the cam is mounted to be movable on the fixed structure in rotation about an axis of deflection, parallel to the axis of rotation, between a first position corresponding to the stowed position and a second position corresponding to the deployed position, and the cam has a first groove in the form of an L, a first branch of which is globally parallel to the longitudinal axis X and a second branch of which is globally radial relative to the longitudinal axis X.

Advantageously, the deployment system also comprises a return element that urges the cam in the first position.

Advantageously, the cam also comprises a second groove in the form of an arc of an circle centered on the axis of deployment and the slider is arranged such as to move in the second groove when the cam pivots from the first position to the second position.

The invention also proposes a bypass turbojet comprising an engine and a nacelle according to one of the preceding variants that surrounds the engine, and where the duct is delimited between the nacelle and the engine.

The invention also proposes an aircraft comprising at least one bypass turbojet according to the preceding variant.

BRIEF DESCRIPTION OF THE DRAWINGS

The above-mentioned features of the invention and also other features will become more clearly apparent on reading the following description of an exemplary embodiment, the description being given with reference to the appended drawings, in which.

DETAILED DESCRIPTION OF THE PREFERRED EMBODIMENTS

Figure 1:
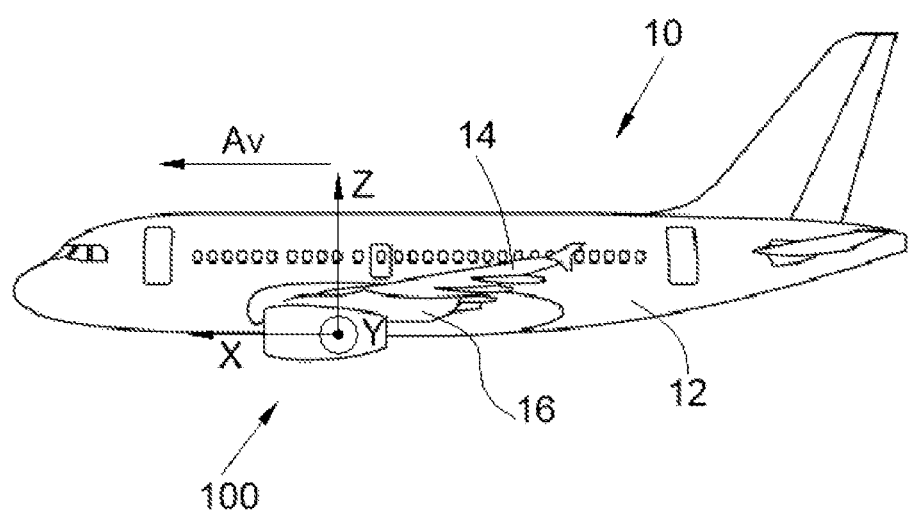
FIG. 1 is a side view of an aircraft comprising a nacelle according to the invention.

In the following description, terms relating to a position are taken with reference to an aircraft in a position of forward travel, as shown in FIG. 1.

FIG. 1 shows an aircraft 10 that comprises a fuselage 12, on either side of which is fixed a wing 14 that bears at least one bypass turbojet 100 according to the invention. The bypass turbojet 100 is fixed under the wing 14 by means of a pylon 16.

In the following description, and by convention, X denotes the longitudinal axis of the bypass turbojet 100 that is parallel to the longitudinal axis of the aircraft 10 and oriented positively in the direction of forward movement of the aircraft 10, Y denotes the transverse axis of the bypass turbojet 100 that is horizontal when the aircraft is on the ground, and Z denotes the vertical axis when the aircraft is on the ground, these three directions X, Y and Z being orthogonal relative to one another. In the rest of the description, the terms "front" and "rear" are to be considered in relation to the direction of movement of the aircraft embodied by an arrow Av in FIG. 1.

Figure 2:
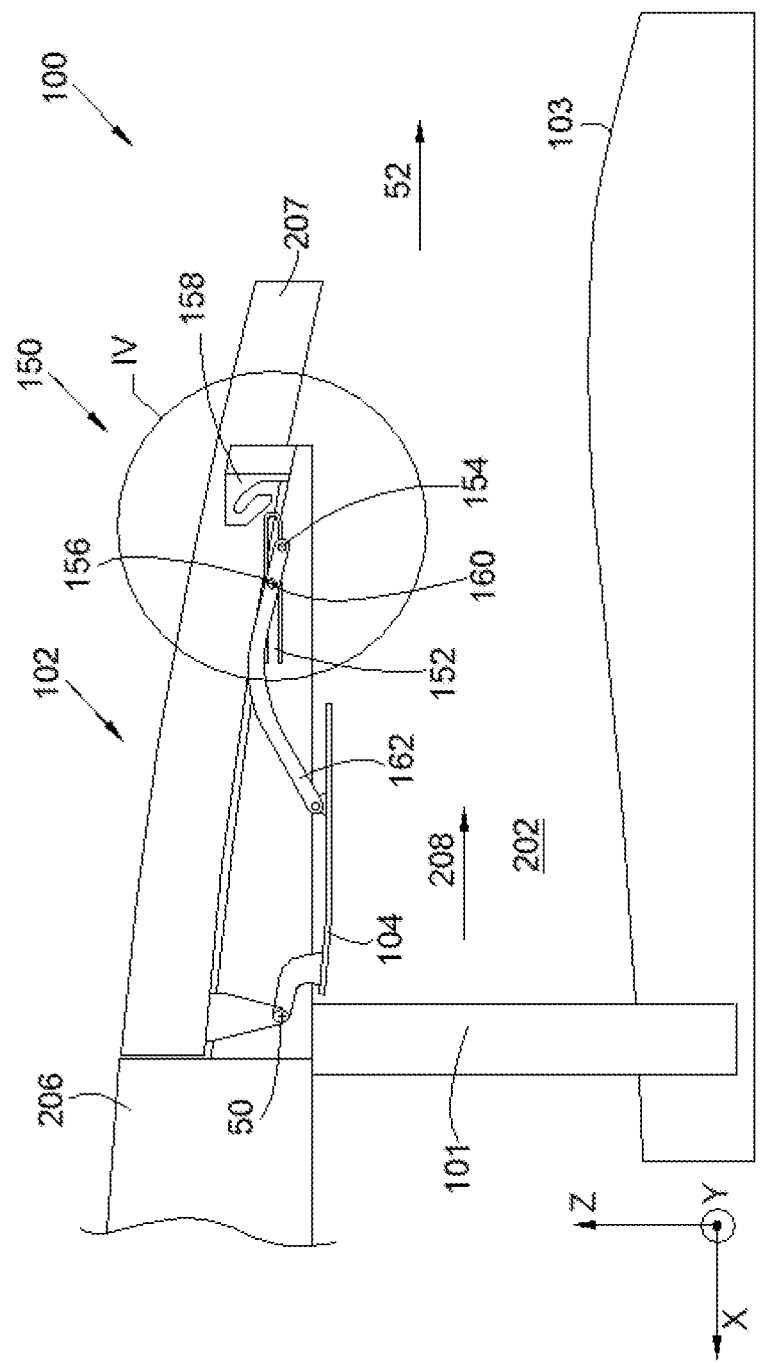
FIG. 2 is a side and sectional view of a nacelle according to the invention in the closed position and in the stowed position.
Figure 3:
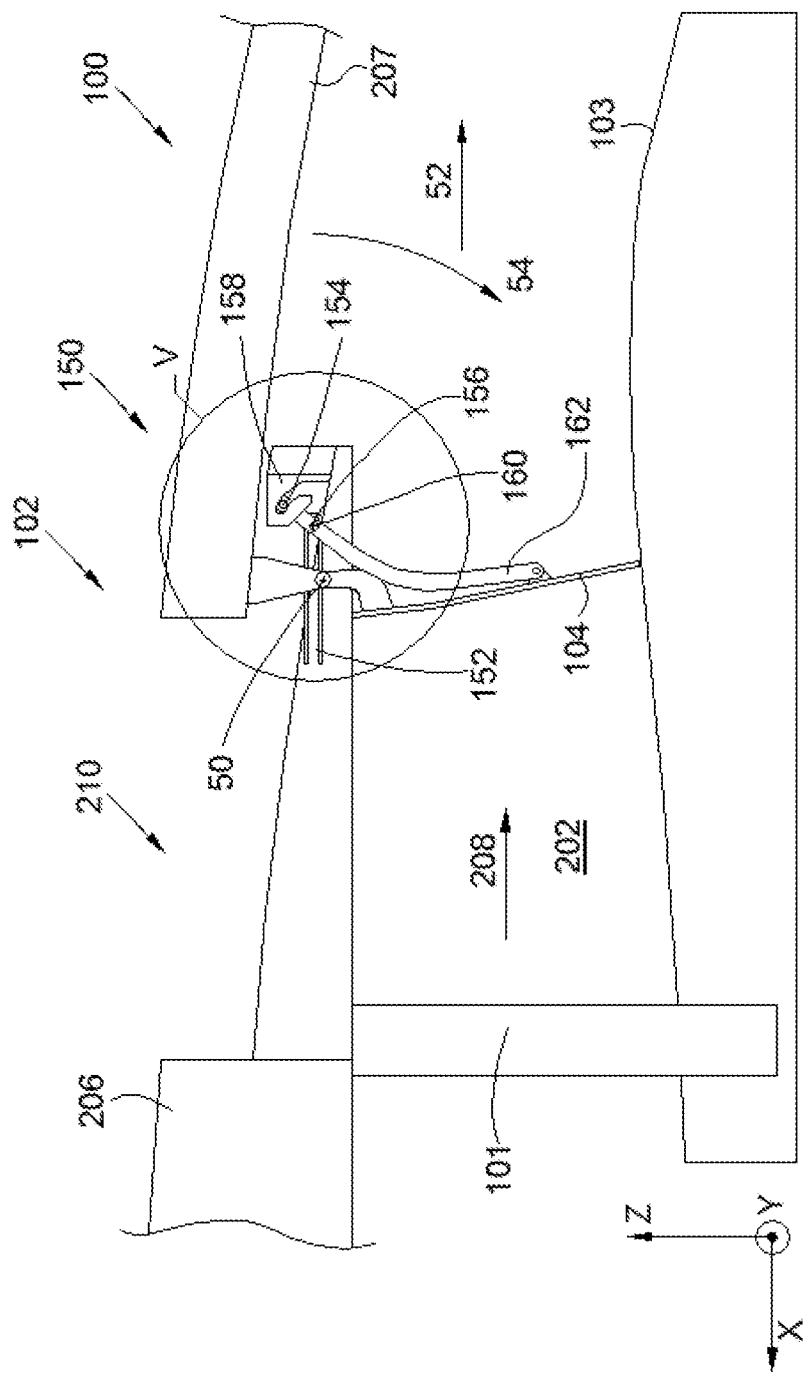
FIG. 3 is a view similar to the view of FIG. 2, but in the open position and in the deployed position.

FIGS. 2 and 3 show the bypass turbojet 100 that comprises a nacelle 102 and an engine housed inside the nacelle 102. The bypass turbojet 100 has a duct 202 between the nacelle 102 and the engine through which the secondary flow 208 circulates.

The engine is embodied, here, by its fairing 103.

The nacelle 102 comprises at least one blocking door 104. In particular, there may be two blocking doors 104 arranged one facing the other, or four blocking doors 104 distributed regularly over the periphery of the nacelle 102. Each blocking door 104 makes it possible, depending on the position thereof, to reverse the thrust of the bypass turbojet 100.

In the following description, the invention is more particularly described in the case of one blocking door 104, but it applies in the same way to each blocking door 104 when there is a plurality thereof.

For each blocking door 104, the nacelle 102 has an opening 210 (FIG. 3) open between the duct 202 and the exterior of the nacelle 102.

The nacelle 102 has a fixed cowling 206 that delimits the opening 210 at the front relative to the longitudinal axis X and is mounted to be fixed on a fixed structure 101 of the nacelle 102.

The nacelle 102 has a movable cowling 207 that delimits the opening 210 at the rear relative to the longitudinal axis X. The movable cowling 207 is mounted to be movable in translation in a translational direction globally parallel to the longitudinal axis X on the fixed structure 101 and thus relative to the fixed cowling 206. Translation is achieved by any appropriate means such as, for example, slide ways.

The fixed cowling 206 and the movable cowling 207 each have an exterior surface constituting the exterior shell of the nacelle 102 and an interior surface constituting an exterior wall of the duct 202. The fairing 103 of the engine constitutes an interior wall of the duct 202.

The movable cowling 207 is movable between a closed position (FIG. 2), in which it is close to the fixed cowling 206, and an open position (FIG. 3), in which it is remote from the fixed cowling 206 towards the rear in such a manner as to enlarge the opening 210. The direction of movement from the closed position to the open position is shown by the arrow 52.

The nacelle 102 also comprises drive means for moving the movable cowling 207 from the closed position to the open position, and vice versa, and they may, for example, comprise rams, ball screws, motors or any other appropriate means for moving an element in translation. The drive means are commanded by a control unit, of the processor type, that commands, for example, the extension and the shortening of the rams in accordance with the requirements of the aircraft 10.

The blocking door 104 is mounted to be movable in rotation about an axis of rotation 50 on the movable cowling 207, between a stowed position (FIG. 2) and a deployed position (FIG. 3), in which case thrust reversal is at its most efficient. In the embodiment of the invention shown in FIGS. 2 and 3, the axis of rotation 50 is perpendicular to the longitudinal axis X. The axis of rotation 50 is, here, at the front edge of the blocking door 104. The direction of rotation between the stowed position and the deployed position is shown by the arrow 54.

The axis of rotation 50 is in a plane substantially perpendicular to a radial direction relative to the longitudinal axis X.

In the stowed position, the blocking door 104 is positioned outside of the duct 202. In the open position, the movable cowling 207 is moved towards the rear such as to facilitate maneuvering of the blocking door 104, which passes from the stowed position to the deployed position.

When the blocking door 104 is in the deployed position, the blocking door 104 lies across the duct 202 and deflects at least a portion of the secondary flow 208 towards the exterior through the opening 210. In the deployed position, the free edge of the blocking door 104 is near to the fairing 103 of the engine. In FIG. 3, the blocking door 104 is lowered, in the deployed position.

Passage from the stowed position to the deployed position of the blocking door 104 is coordinated and delayed relative to the passage from the closed position to the open position of the movable cowling 207, and vice versa.

Upon passage from the stowed position to the deployed position, rotation of the blocking door 104 commences when the movable cowling 207 passes via an intermediate position between the closed position and the open position. Conversely, upon passage from the deployed position to the stowed position, rotation of the blocking door 104 stops when the movable cowling 207 passes via the intermediate position, returning from the open position towards the closed position.

Figure 4:
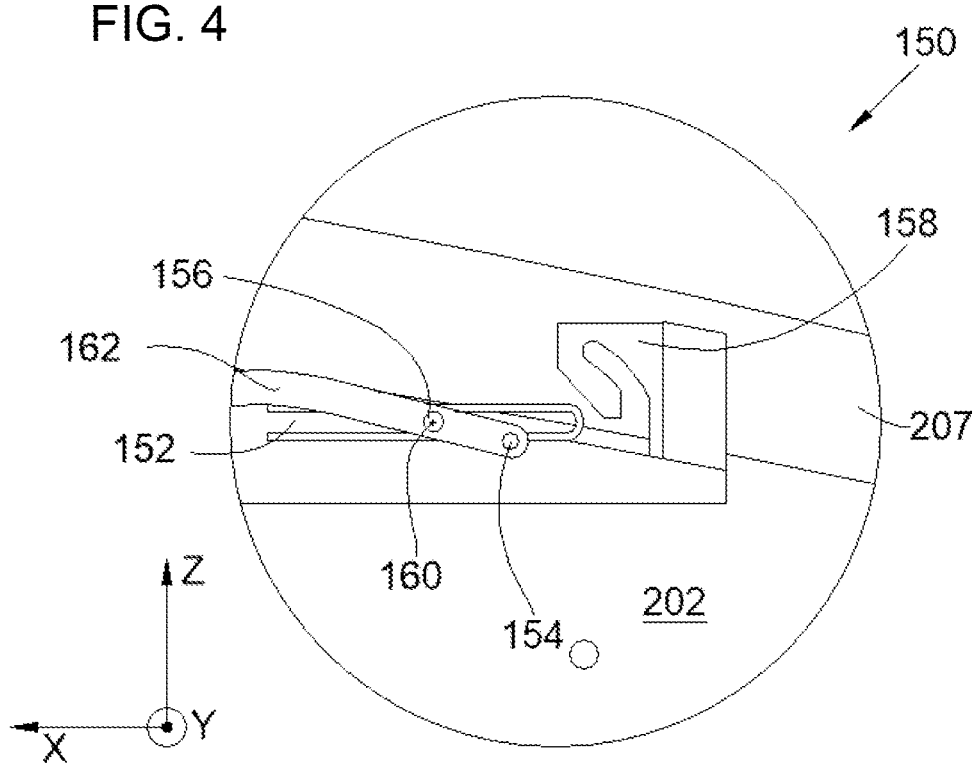
FIG. 4 is an enlargement of a deployment system according to a first embodiment of the invention and corresponding to detail IV in FIG. 2.
Figure 5:
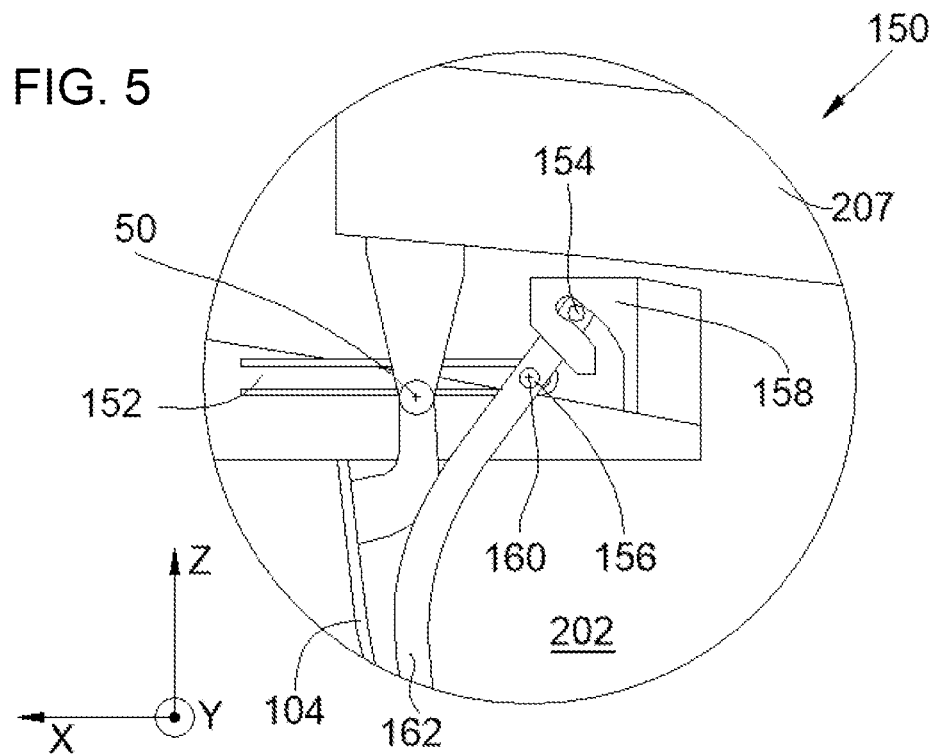
FIG. 5 is an enlargement of the deployment system according to the first embodiment of the invention and corresponding to detail V in FIG. 3.
Figure 6:
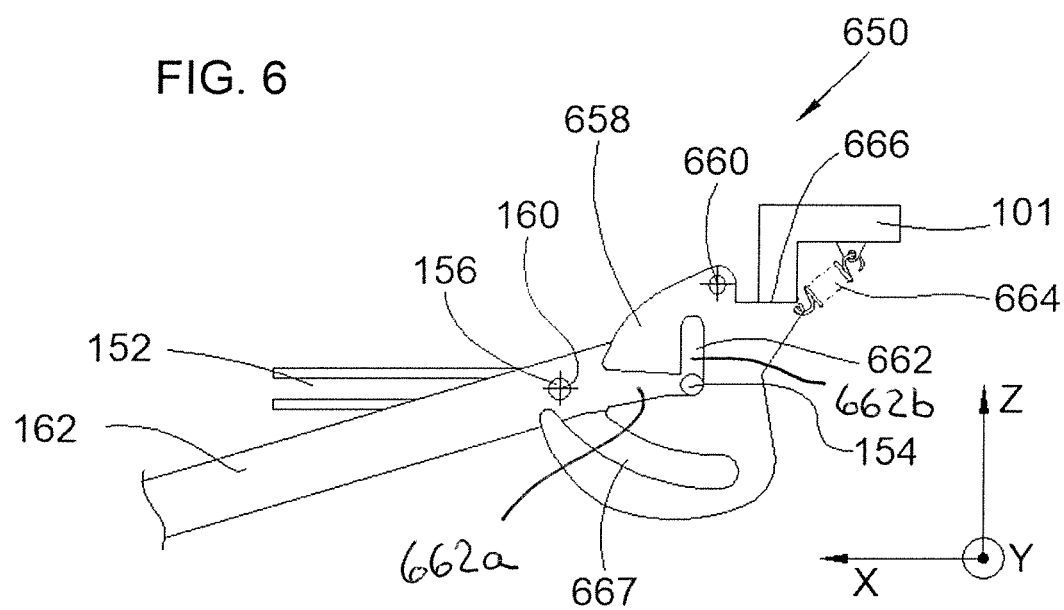
FIG. 6 is an enlargement similar to that of FIG. 4 for a deployment system according to a second embodiment of the invention in the stowed position.
Figure 7:
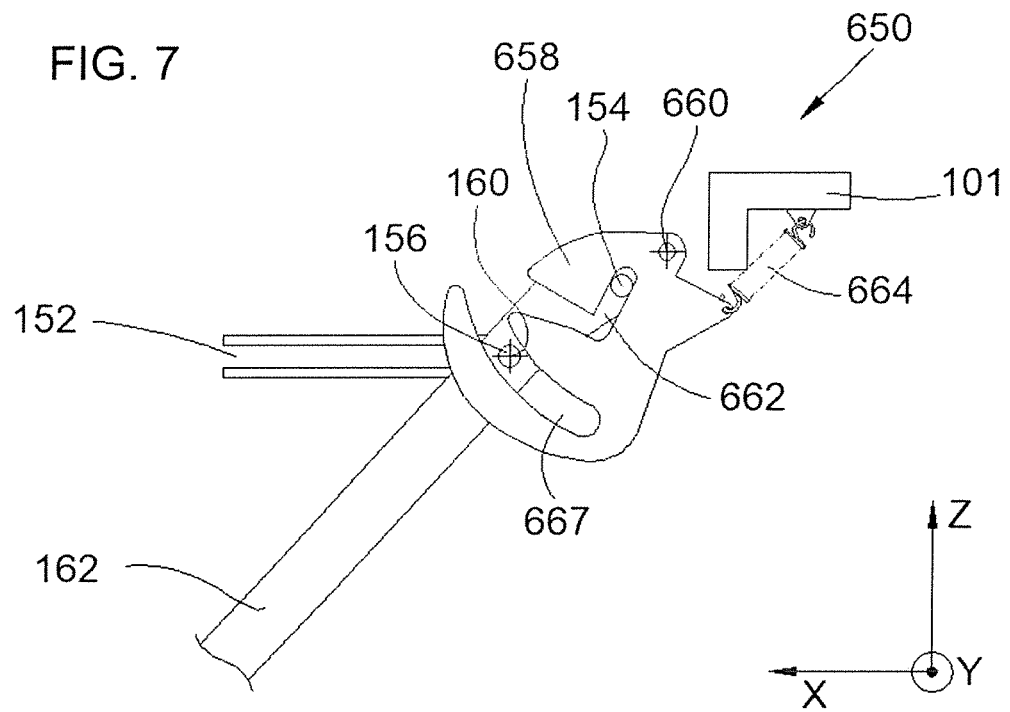
FIG. 7 is an enlargement of the deployment system according to the second embodiment of the invention in the deployed position.

This coordination and this offsetting are provided by a deployment system 150, 650. FIGS. 4 and 5 show a deployment system 150 according to a first embodiment of the invention, and FIGS. 6 and 7 show a deployment system 650 according to a second embodiment of the invention.

In both embodiments, the deployment system 150, 650 comprises:
- an arm 162 comprising a first end mounted in an articulated manner on the blocking door 104 and a second end that bears a stop 154,
- a slider 156 that is fixed to the arm 162,
- a linear guide system 152 that is fixed on the fixed structure 101 and guides the slider 156 parallel to the translational direction, and
- a cam 158, 658, where the stop 154 is arranged such as to lie against the cam 158, 658 when the movable cowling 207 reaches the intermediate position from the closed position and such as to be guided by the cam 158, 658 in such a manner as to drive the rotation of the arm 162 about the slider 156 about an axis of deployment 160 parallel to the axis of rotation 50 when the movable cowling 207 moves from the intermediate position to the open position.

The slider 156 is still guided by the guide system 152 throughout maneuvering from the closed/stowed position to the open/deployed position, and vice versa.

The deployment system 150, 650 thus remains outside the duct 202.

The deployment system 150, 650 is arranged at the rear of the axis of rotation 50 and of the blocking door 104 and towards the exterior relative to the duct 202, i.e., globally in the movable cowling 207.

Here, the guide system 152 is a groove in which the slider 156 moves and the groove is, here, closed at its rear end to prevent the exit of the slider 156 and thus facilitates rotation when the slider 156 reaches the closed rear end. The position of the closed rear end is thus defined in order that the slider 156 arrives against the closed rear end at the same time as the stop 154 arrives against the cam 158, 658.

The articulation of the arm 162 on the blocking door 104 is arranged on the rear face of the blocking door 104, i.e., the face oriented towards the rear when the blocking door 104 is in the deployed position.

When the movable cowling 207 moves from the closed position to the open position, the slider 156 is guided by the guide system 152 and as long as the stop 154 does not enter into contact with the cam 158, 658 the blocking door 104 remains stationary. When the stop 154 arrives in contact with the cam 158, 658, the latter urges the stop 154 to move, which drives the rotation of the arm 162 about the slider 156 and the deployment of the blocking door 104 towards the deployed position. There is thus a delay in the rocking of the blocking door 104.

Conversely, when the movable cowling 207 moves from the open position to the closed position, the stop 154 again follows the cam 158, 658, but in the opposite direction, in such a manner as to return the arm 162 to the initial position by rotation about the slider 156 and the blocking door 104 to its stowed position. Then, the stop 154 is released from the cam 158, 658 and the slider 156 moves along the guide system 152 to return to the closed position.

The intermediate position corresponds, here, to the moment when the stop 154 arrives in contact with the cam 158, 658 or relinquishes contact with the cam 158, 658.

In the first embodiment of the invention, the cam 158 is mounted to be fixed on the fixed structure 101 and comprises a groove in the form of an arc of a circle that is globally centered on the axis of deployment 160 when the stop 154 arrives against the cam 158.

In the second embodiment, the cam 658 is mounted to be movable in rotation on the fixed structure 101 about an axis of deflection 660 parallel to the axis of rotation 50. The cam 658 has a first groove 662 in the form of an L, a first branch 662a of which is globally parallel to the longitudinal axis X and of which a second branch 662b is globally radial relative to the longitudinal axis X.

During movement from the closed position to the intermediate position, the stop 154 first moves outside of the first groove 662, then along the first branch and arrives in contact with the second branch (FIG. 6), and the continuation of the translational movement of the movable cowling 207 towards the open position rocks the cam 658 about its axis of deflection 660 and moves the stop 154 along the second branch (FIG. 7), which rotates of the arm 162 abut the slider 156 and the movement of the blocking door 104 into the deployed position. The cam 658 then passes from a first position (FIG. 6) corresponding to the stowed position to a second position (FIG. 7) corresponding to the deployed position. Reverse movement allows the return to the closed/stowed position.

The deployment system 650 also comprises a return element 664 that urges the cam 658 in the first position corresponding to the stowed position. Here, the return element 664 is a traction spring fixed between the fixed structure 101 and the cam 658. The return element 664 facilitates the return of the cam 658 into the first position upon movement from the open position towards the closed position.

In order to stop the cam 658 in the first position, the cam 658 abuts against the fixed structure 101 at a bearing surface 666.

The axis of deflection 660 is, here, to the outside and to the rear of the second branch.

The cam 658 also comprises a second groove 667 in the form of an arc of a circle centered on the axis of deflection 660 and the slider 156 is arranged such as to move in the second groove 667 when the cam 658 pivots between the first position (from the intermediate position) and the second position corresponding to the deployed position. The insertion of the slider 156 into the second groove 667 additionally blocks the withdrawal of the arm 162.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle for a bypass turbojet, said nacelle comprising:
a fixed structure comprising a fixed cowling,
a movable cowling movable in translation relative to the fixed cowling in a translational direction parallel to a longitudinal axis between a closed position, in which the movable cowling is near to the fixed cowling, and an open position, in which the movable cowling is remote from the fixed cowling, towards a rear of the nacelle, such as to define between the movable cowling and the fixed cowling an opening between a duct for a secondary flow and an exterior of the nacelle,
drive means configured to move the movable cowling from the closed position to an intermediate position, then to the open position, and vice versa,
a blocking door mounted to be movable in rotation about a rotation axis on the movable cowling between a stowed position, in which the blocking door is positioned outside the duct, and a deployed position, in which the blocking door lies across the duct, and
a deployment system provided such as to coordinate and to delay a passage from the stowed position to the deployed position of the blocking door relative to a passage from the closed position to the open position of the movable cowling, and vice versa, said deployment system comprising:
an arm comprising a first end mounted in an articulated manner on the blocking door and a second end that bears a stop,
a slider that is fixed to the arm,
a linear guide system that is fixed on the fixed structure and guides the slider parallel to the translational direction, and
a cam, where the stop is arranged such as to lie against the cam when the movable cowling reaches the intermediate position from the closed position and such as to be guided by said cam to drive a rotation of the arm about the slider about an axis of deployment parallel to the rotation axis when the movable cowling moves from the intermediate position to the open position.

2. The nacelle according to claim 1, wherein the linear guide system is a groove in which the slider moves, wherein the groove is closed at a rear end of the groove, and wherein a position of the closed rear end of the groove is defined such that the slider arrives against the rear end at the same time as the stop arrives against the cam.

3. The nacelle according to claim 1, wherein the articulated mounting of the arm on the blocking door is arranged on a rear face of said blocking door.

4. The nacelle according to claim 1, wherein the cam is mounted to be fixed on the fixed structure and comprises a groove formed as an arc of a circle.

5. The nacelle according to claim 1, wherein the cam is rotatably movably mounted on the fixed structure about an axis of deflection, parallel to the axis of rotation, between a first position corresponding to the stowed position and a second position corresponding to the deployed position, and wherein the cam has a first groove formed as an L, a first branch of which is globally parallel to the longitudinal axis and a second branch of which is globally radial relative to the longitudinal axis.

6. The nacelle according to claim 5, wherein the deployment system also comprises a return element that urges the cam in the first position.

7. The nacelle according to claim 5, wherein the cam also comprises a second groove formed as an arc of a circle centered on the axis of deployment and wherein the slider is arranged such as to move in the second groove when the cam pivots from the first position to the second position.

8. A bypass turbojet comprising an engine and the nacelle according to claim 1 that surrounds the engine, and where the duct is delimited between the nacelle and the engine.

9. An aircraft comprising at least one bypass turbojet according to claim 8.

* * * * *